LORD & WOODMAN.
Cultivator.

No. 61,943

Patented Feb. 12, 1867.

WITNESSES:

INVENTORS

Ivory Lord
Sewall Woodman

United States Patent Office.

IVORY LORD AND SEWALL WOODMAN, OF SACO, MAINE.

Letters Patent No. 61,943, dated February 12, 1867.

---

IMPROVEMENT IN CULTIVATORS.

---

*The Schedule referred to in these Letters Patent and making part of the same.*

---

TO ALL WHOM IT MAY CONCERN:

Be it known that we, IVORY LORD and SEWALL WOODMAN, of Saço, in the county of York, and State of Maine, have invented a new and useful Improvement in Cultivators; and we do hereby declare that the following is a full, clear, and exact description of the construction and operation of the same, reference being had to the accompanying drawings, making a part of this specification, in which—

Figure 1:
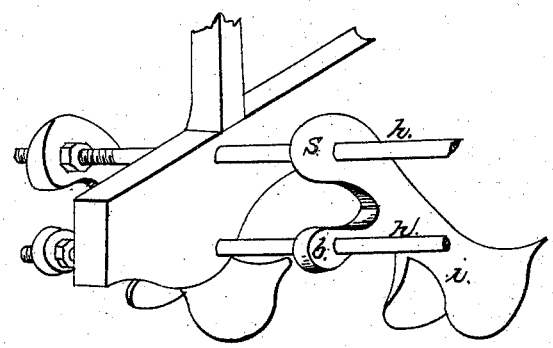

Figure 1 is a view of a section of the rear part of the machine.

Figure 2:
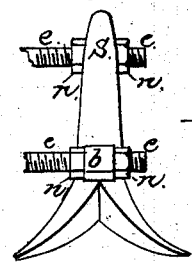

Figure 2, a rear view of a single tooth.

Figure 3:
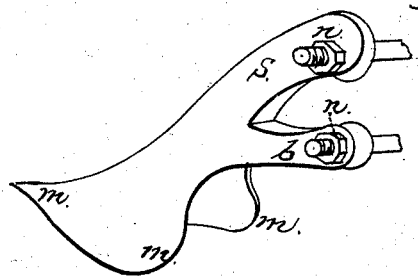

Figure 3, an oblique view of a single tooth.

Figure 4:
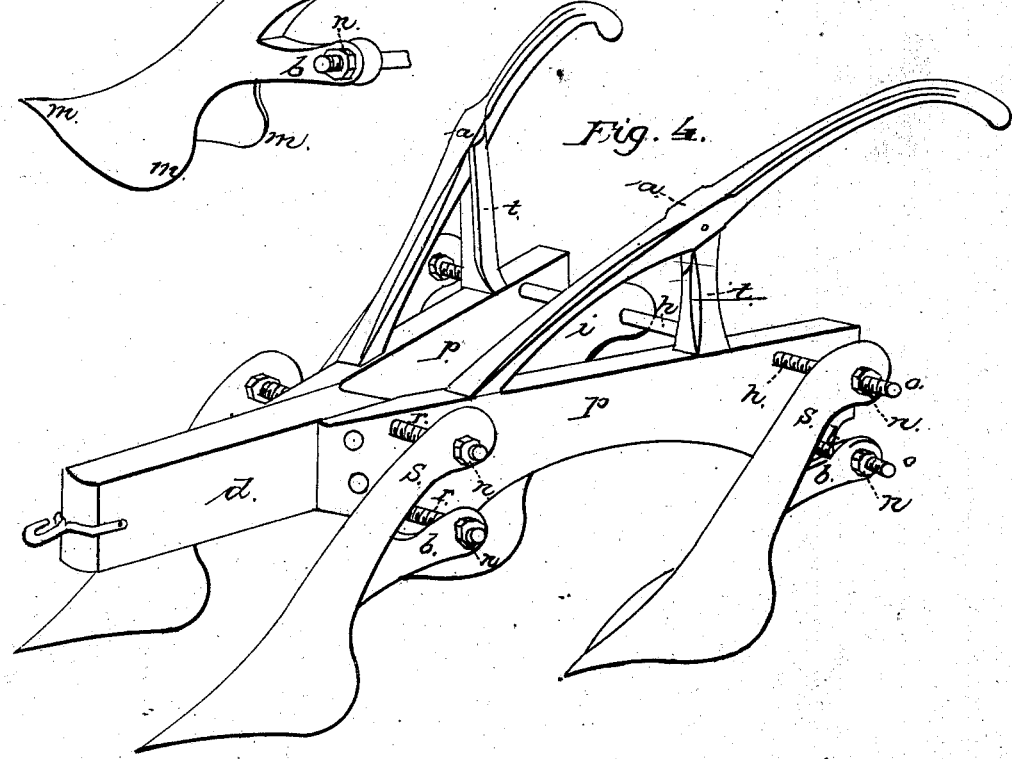

Figure 4, a view of the cultivator complete.

The frame of the cultivator represented in the drawings by the red shade, is of wood, and not materially different from that of ordinary cultivators, and we disclaim any improvement in relation thereto. It consists of the side pieces P P, fig. 4, bolted to the centre piece or draught beam $d$, the handles $a\ a$, standards $t\ t$, &c.

The teeth, five in number, are to be of cast iron, with point and mould-boards $m\ m\ m$, fig. 3, similar to those in general use, with an elongated shank, as represented at $s$, fig. 3, and the brace $b$, extending from the rear of the shank, the brace and the shank each to be perforated transversely, so as to admit of the rods or arms $r\ r$ and $h\ h$, figs. 1 and 4, by which the teeth are attached to the frame. The rods or arms, $r\ r,\ h\ h$, in figs. 1 and 4, may be of wrought iron, one inch in diameter, or otherwise, as the manufacturer may elect, and are to pass transversely through the frame, two, $r\ r$, near the front, and two, $h\ h$, near the rear, one above the other, and at a distance from each other to correspond with the distance between the holes in shank and brace, through which they are to pass also, as shown in figs. 1, 2, 3, 4. The rods by which the two front teeth are attached may be twelve inches long, passing through the frame, which is about four inches thick at that point, projecting about four inches on either side, on the ends of which threads are cut, as shown in fig. 2, $e\ e\ e\ e$, and the teeth secured theron by nuts $n\ n\ n\ n$ on both sides of shank and brace. The rods $h\ h$, fig. 4, by which the three hind teeth are attached, are two feet long, and pass through the side pieces of the frame P P, near the rear ends, and also through the middle tooth $i$, figs. 1 and 4, situated between the side pieces, and about five inches distant from each, as at $h\ h$, fig. 1, and are secured in their places by keys, not represented in the drawings. The rods project about five inches on either side of the frame, as shown in $o\ o$, fig. 4, and the teeth are attached to them in the same manner as the front teeth are secured, and may be moved in or out by the nuts $n\ n$, as the operator may desire.

The design of this cultivator is to pulverize and disintegrate the soil, generally and more especially for use among corn, potatoes, and all other hoed crops planted in rows or drills, and it may be narrowed or widened for that purpose as the operator demands.

The construction of the teeth herein described is such that roots, vines, witch grass, or any other weeds that infest the soil cannot find a lodgment thereon, but pass up and fall off or over them, interposing no obstacle to the clear, perfect, and successful operation of the machine.

What we claim as our invention, and desire to secure by Letters Patent, is—

1. The shank $s$, as shown in all the figures of the drawings, elongated and perforated as described, and the brace $b$ connected therewith.

2. The attachment of the teeth by the rods or arms at a distance from the wood, as shown in figs. 1 and 4, and secured in place by nuts and keys, as described.

3. The mode of widening or narrowing the machine by sliding the teeth on the arms $r\ r,\ h\ h$, in fig. 4, and the combination of all forming the cultivator, as represented and described.

IVORY LORD,
SEWALL WOODMAN.

Witnesses:
S. H. MILLIKEN,
FERDINAND W. GUPTILL.